(12) United States Patent
Smyth et al.

(10) Patent No.: US 8,065,708 B1
(45) Date of Patent: Nov. 22, 2011

(54) METHOD FOR REDUCING LATENCY IN AN INTERACTIVE INFORMATION DISTRIBUTION SYSTEM

(75) Inventors: Aidan James Smyth, San Francisco, CA (US); Christopher W. B. Goode, Menlo Park, CA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 09/458,319

(22) Filed: Dec. 10, 1999

Related U.S. Application Data (60) Provisional application No. 60/127,121, filed on Mar. 31, 1999.

(51) Int. Cl.
*H04N 7/173* (2011.01)

(52) U.S. Cl. ............. 725/93; 725/116; 725/91; 725/114

(58) Field of Classification Search .................... 725/88, 725/102, 116, 93, 146; 700/96
See application file for complete search history.

(56) References Cited

U.S. PATENT DOCUMENTS

| | | | |
|---|---|---|---|
| 5,499,046 A | 3/1996 | Schiller et al. | 348/6 |
| 5,781,227 A | 7/1998 | Goode et al. | 348/7 |
| 5,819,160 A | 10/1998 | Foladare et al. | 455/45 |
| 5,892,915 A * | 4/1999 | Duso et al. | 709/219 |
| 5,924,071 A * | 7/1999 | Morgan et al. | 704/278 |
| 5,983,069 A | 11/1999 | Cho et al. | 455/3.1 |
| 5,996,015 A | 11/1999 | Day et al. | 709/226 |
| 6,018,768 A * | 1/2000 | Ullman et al. | 709/218 |
| 6,026,439 A * | 2/2000 | Chowdhury et al. | 709/223 |
| 6,038,000 A | 3/2000 | Hurst, Jr. | |
| 6,065,050 A * | 5/2000 | DeMoney | 709/219 |
| 6,137,834 A | 10/2000 | Wine et al. | |
| 6,141,358 A | 10/2000 | Hurst, Jr. et al. | |
| 6,181,383 B1 | 1/2001 | Fox et al. | |
| 6,452,609 B1 * | 9/2002 | Katinsky et al. | 345/716 |
| 6,459,811 B1 | 10/2002 | Hurst, Jr. | |
| 6,567,986 B2 | 5/2003 | Ward et al. | |

OTHER PUBLICATIONS

Hurst, et al., "Splicing FAQ", 1997, source: www.mpeg.org.*

* cited by examiner

*Primary Examiner* — Pankaj Kumar
*Assistant Examiner* — Usha Raman
(74) *Attorney, Agent, or Firm* — Merchant & Gould (57) ABSTRACT

A method and apparatus for reducing latency caused by information server processing of subscriber request wherein a plurality of content streams defined by a playlist are sequentially provided to a subscriber in a substantially seamless manner and wherein the playlist is updated and otherwise maintained in response to subscriber commands and requests.

10 Claims, 3 Drawing Sheets

METHOD FOR REDUCING LATENCY IN AN INTERACTIVE INFORMATION DISTRIBUTION SYSTEM

CROSS REFERENCE TO RELATED APPLICATIONS

This application claims benefit of U.S. Provisional Patent Application Ser. No. 60/127,121, which was filed on Mar. 31, 1999 and is incorporated herein by reference in its entirety.

BACKGROUND OF THE INVENTION

1. Field of the Invention

The present invention relates to an information distribution system such as a video-on-demand (VOD) system providing information services to a plurality of subscribers. More particularly, the present invention relates to a method for reducing the latency experienced by system subscribers transitioning between offered information services within such a system while maintaining high quality presentation of subscriber requested information services.

2. Description of the Background Art

In an information distribution system, such as video on demand (VOD) system, an information provider (e.g., a headend in a cable television system) must control of the distribution of requested information to ensure that requests for information, such as video information, are satisfied in an orderly manner.

Compression and decompression techniques utilized within such systems to efficiently store and provide content to system customers (e.g., users or subscribers within a VOD system), as well as processing of control information provided by such customers requires a substantial amount of time. As such, a customer may experiences a significant delay or latency between the time a function is selected (via a set top terminal or set top box associated with the customer) and the time that the selected function is actually implemented upon the screen of their television. Heretofore this latency has merely been an annoyance which, for the most part, has been ignored by the interactive information distribution system providers.

Typically, upon selection of a certain function, such as stop or pause, while viewing a particular video stream, the present VOD systems merely delay the time of implementing that stop or pause function by the amount of latency, which can be in excess of five seconds. Furthermore, if a customer has a particular video stream being displayed and then selects a second video stream for display, present systems, after a slight control signal processing delay, switch from one video stream to another video stream without any attempt to smooth the transition. As such, the video that is received and decoded by the user's set top terminal is generally garbled or distorted during the transition period. If a customer is rapidly switching from video stream to video stream, e.g., channel surfing, the customer will view garbled video images for a substantial amount of time between "channel" changes. Such an extended period of garbled images is unacceptable for a commercial system.

A method and apparatus for masking the effects of latency within an interactive information distribution system is described in U.S. Pat. No. 5,781,227, issued Jul. 14, 1998 and assigned to DIVA Systems Corporation of Redwood City, Calif. The '227 patent utilizes, inter alia, video and audio masking techniques at the set top terminal to mask latency inherent in transitioning between information streams.

Unfortunately, the '227 patent masks latency without addressing contributions to system latency caused by information server processing of subscriber requests. Therefore, there is a need in the art for a method and apparatus for avoiding the effects of latency in an interactive information distribution system. More specifically, there is a need for a method and apparatus for reducing latency caused by information server processing of subscriber requests.

SUMMARY OF THE INVENTION

The disadvantages heretofore associated with the prior art are overcome by the present invention of a method and apparatus for reducing latency wherein a plurality of content streams defined by a playlist are sequentially provided to a subscriber in a substantially seamless manner and wherein the playlist is updated and otherwise maintained in response to subscriber commands and requests. It is also seen to be desirable to ensure that a plurality of user requests for content are structured as a concatenated series of video clips or other content, such that user navigation of the concatenated content is enabled.

The present invention operates to synchronize, to the extent possible, the streaming or providing of various content streams to a customer within an interactive information distribution system such that transitions between provided content streams are anticipated and smoothly executed.

Specifically, in an information distribution system including provider equipment and subscriber equipment, the provider equipment communicating to the subscriber equipment information streams representing content requested by the subscriber equipment, an apparatus according to the invention comprises: a session manager, for interacting with the subscriber equipment and maintaining a playlist, the playlist defining at least one content stream to be provided to the subscriber; a server, for storing content streams; and a server controller, for retrieving from the server content streams defined by the playlist, the content streams being provided to the subscriber; wherein the session manager modifying the playlist in response to playlist modification commands received from the subscriber equipment.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention will be primarily described within the context of a video on demand (VOD) systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/

IEC standards 13818, which is incorporated herein by reference in its entirety. Additionally, a compressed digital video system is described in the Advanced Television Systems Committee (ATSC) digital television standard document A/53, incorporated herein by reference. It will be appreciated by those skilled in the art that the teachings of the present invention may be advantageously applied to other information distribution systems where components or functional elements within the system are bandwidth constrained.

A primary purpose of this invention is to enable information services that would be best implemented by sequencing video clips from a file server and presenting the sequence of video clips on, e.g., a display device in a manner avoiding visible or audible anomalies.

Figure 1:
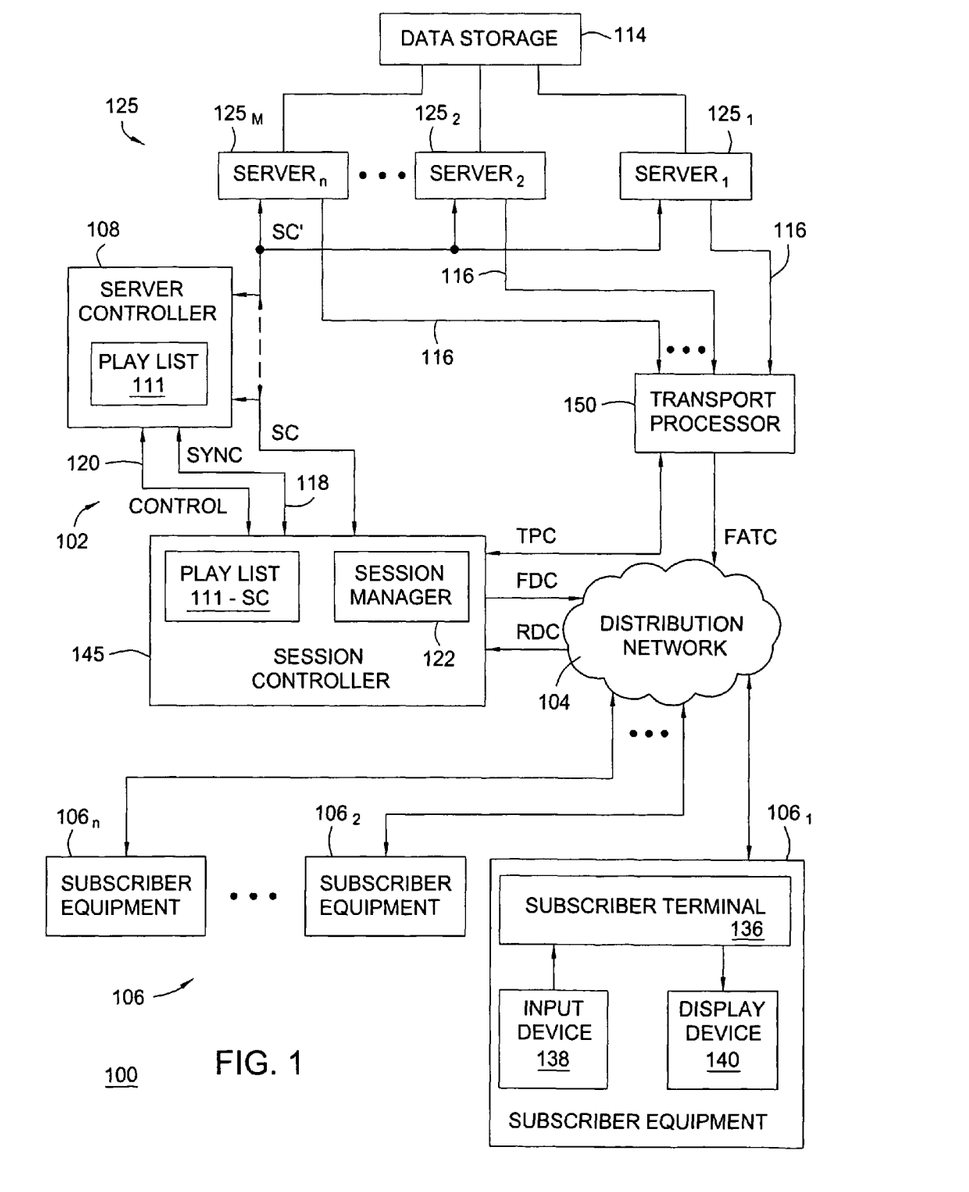
FIG. 1 depicts a high level block diagram of an interactive information distribution system containing the present invention.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications network 104 and subscriber equipment $106_n$, where n is an integer greater than zero.

The service provider equipment 102 comprises a server controller 108, a plurality of servers $125_1$-$125_m$ (collectively servers 125), a session controller 145 and a transport processor 150. It should be noted that only one server 125 is required to practice the invention.

The servers 125 are used to store content such as movies, television programs and other information offerings of the interactive information distribution system 100 of FIG. 1. Additionally, the servers 125 are used to store assets such as bit map imagery, graphic overlay, control scripts and the like. The assets may comprise, for example, navigation assets that are used by a set top terminal to interactively navigate, and select for viewing, the offerings or content available from the service provider equipment 102. The servers 125, in response to a control signal SC produced by the session controller 145, provide content and/or asset data to the transport processor 150.

The server controller 108 interacts with the at least one server 125 (e.g., a disk drive array) that generally stores the subscriber information (e.g., video data) that will be recalled and downloaded to the subscriber. The server controller 108 communicates with the at least one server via server control path (SC'). Optionally, a plurality of servers $125_1$-$125_m$, where m is an integer greater than zero, may interact with the information server 108. The server controller 108 controls the access of information, such as video information, from the servers 125 and the providing (via the transport processor 150) of the accessed information to a set top terminal of a subscriber requesting the information. Information requests are handled by the session controller 145 and communicated to the server controller 108.

The server controller 108 is coupled to the session controller 145 via data path SC. The server controller 108 includes a playlist 111 that is used to store a list of content requested by each respective subscriber. Optionally, the playlist may be stored in the session controller 145 as playlist 111-SC. The operation of the playlist will be described in more detail below with respect to FIG. 2.

The server controller 108 is coupled to the session controller via data path SC, synchronization clock path 118 and control path 120. The server controller 108 sends a request to the servers 125 via path SC', and provides data streams on data path 116 in response to requests for information from the session controller on path 120. The data streams are retrieved by the servers 125 from the data storage unit 114 and sent to the transport processor 150 via paths 116.

Each of the servers 125 stores a plurality of content streams, such as video content streams including associated audio content. It is noted that these content streams may include auxiliary program information, such as fast forward (FF) and rewind (REW) tracks or streams. A FF track comprises, effectively, a temporally sub-sampled version of a main program of the content stream. A REW track comprises, effectively, a reverse-ordered and temporally sub-sampled version of the main program of the content stream. Such FF and REW tracks are suitable for enabling FF and REW functionality in the information distribution system 100 of FIG. 1. That is, a subscriber may request that a presently presented program be "fast forwarded" or "rewound" to some future or previous point in the program at a rate of, e.g., 5 to 11 times the normal play rate. The appropriate server 125 responsively begins streaming the FF or REW track to the subscriber in response to the request.

The session controller 145 provides session control of the information flowing to and from the servers 125, and may be generally described as a system providing or controlling communications between, for example, a cable system head-end and one or more set top terminals. The session controller 145 includes a session manager 122, and produces the storage control signal SC for controlling and communicating with the servers 125, and a transport processor control signal TPC for controlling and communicating with the transport processor 150. In response to a user request for particular content, the session controller 145 causes the requested content file and any associated assets to be streamed from the appropriate server 125 to the transport processor 150.

The session controller 145 sends data, such as commands, encryption keys and the like, to set top terminals 106 via a forward data channel (FDC). The session controller 145 receives data, such as information stream requests and session initiation data (set top identification, capability and the like) via a reverse data channel (RDC). The FDC and RDC are supported by the distribution network 104 and comprise relatively low bandwidth data channels, such as one-two megabits per second data channels utilizing QPSK, QAM, or other modulation techniques. The FDC and RDC are also known as "out-of-band" channels, while the relatively high bandwidth forward application transport channel (FATC) is also known as an "in-band" channel. The session controller 145 contains an interface device for sending control information via the forward data channel FDC and receiving control information and request information via the reverse data channel RDC using the so-called "out-of-band" carrier frequencies.

The transport processor 150 accomplishes all of the forward content channel transmission interface requirements of the system 100 of FIG. 1. Specifically, the transport processor 150 is coupled to subscriber equipment via the forward applications transport channel (FATC). That is, the transport processor 150 is capable of providing a plurality of scrambled or unscrambled content and/or asset streams modulated onto various carrier frequencies suitable for use in the distribution network 104. The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal via the FDC may be included in the FATC data stream. The transport processor 150 also contains a modulator for modulating the combined content and asset stream onto one or more carrier frequencies for transmission on the FATC, the so-called "in-band" carrier frequencies.

The distribution network 104 can be any one of a number of conventional broadband communications networks that are available such as a fiber optic network, a telephone network, existing cable television network and the like. For example, if the network is a hybrid fibercoax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal 136 receives the data streams from the FATC, demodulates the received data streams and, in the case of video streams, processes the demodulated video streams for subsequent display on the display device 140. In the case of receiving scrambled data streams, the STT descrambles the received data streams using the descrambling messages DM provided to the STT via the FATC or the FDC. The STT uses the authorization messages AM provided via the FATC or FDC to determine if a descrambling of the received scrambled stream is authorized. In addition, the set top terminal 136 accepts commands from the remote control input device 138 or other input device. These commands are formatted, modulated, and transmitted through the distribution network 104 to the session controller 145. Typically, this transmission is accomplished through the reverse data channel RDC. These commands are preferably transmitted through the same network used to transmit information to the set top terminal. However, the RDC coupling the set top terminal to the provider equipment 102 may be a separate network, e.g. a FATC through a television cable network and an RDC through a telephone network. The telephone network could also support the FDC.

The inventors have determined that latency minimization is most readily achieved where the hardware or software module controlling the providing or streaming of video and other content to subscribers has knowledge about what content to stream out once the currently streamed content terminates. That is, where the controlling hardware or software module does not need to communicate with another hardware or software module to determine what to play next. Thus, the present invention utilizes a "playlist" comprising a list of content streams that may be concatenated in a substantially seamless (i.e., low- or no-latency) manner to provide an enjoyable presentation experience to a subscriber.

In one embodiment of the invention, the session controller 145 includes a playlist 111-SC that stores a list of content streams for each subscriber scheduled to receive a content stream. For example, a playlist for a subscriber may comprise data identifying the title, storage location, and presentation time of one or more content streams, such as movies, music and the like.

Each content stream identified in the playlist has associated with it at least a storage location parameter indicative of the server 125 including the content stream. Additionally, the playlist may identify auxiliary information streams, such as fast forward (FF) and rewind (REW) content streams. Upon reaching the end (i.e., terminating) of a presently provided content stream (i.e., a stream being coupled to a subscriber via the FATC), the server controller 108 immediately accesses (from one of the storage units associated with the servers 125) the next content stream and begins streaming the accessed content stream to the subscriber.

In the case of the server controller 108 not being able to independently access the playlist 111 (e.g., the playlist is located in the session controller 145 or other portion of the information distribution system 100), the following mechanism is used. Specifically, at a predetermined point prior to reaching the end of the presently provided content stream, the server controller 108 indicates to the session controller 145 that the end point is approaching. In response, the session controller 145 instructs the server controller 108 as to the next content stream to be provided to the subscriber. The amount of time required for the server controller 108 to transmit the notification to the session controller 145 and receive a response from the session controller 145, must be less than the remaining streaming time of the presently provided content stream.

To ensure smooth transitions between content streams, all content assets, such as video, audio and other information subject to inclusion in the playlist, are constructed in a manner facilitating inter-asset transition (i.e., seamless splicing) such that a smooth presentation of the requested assets may be made by the set top terminal.

For example, in the case of a video asset constructed according to the various MPEG requirements, the splicing capability included within the MPEG standard and/or the SMPTE splicing syntax is utilized to facilitate a brief transition between streams at the set top terminal. Specifically, each content stream incorporates a plurality of splicing points according to, e.g., splicing standards adopted by the Society of Moving Pictures Television Engineers (SMPTE). These standards provide for the insertion of splice point indicators in, e.g., transport packet headers indicative of whether underlying included video elementary streams may be spliced at a particular transport packet boundary. Thus, the first transport packet of a stored content stream comprises a splicing entry point (in-point) and the last transport packet a splicing exit point (out-point). Such entry and exit points are provided throughout the stored content stream such that rapid transitioning between streams may be effected, thereby reducing subscriber-experienced latency.

In the interactive information distribution system 100 of FIG. 1, a playlist or play queue 111 is depicted as residing within the server controller 108. It should be noted that a single playlist or play queue 111 is utilized for one subscriber. Thus, the playlist or play queue 111 actually comprises a plurality of playlists, where each of the plurality of playlists is associated with a respective subscriber or set top terminal. In this manner, each of the plurality of set top terminals may benefit from low latency transitioning between respective requested content streams.

A content stream is added to a subscriber's playlist in response to a content "add" command and deleted from the subscriber's playlist in response to a content "delete" command as in response to a termination of availability of the content (e.g., when a "window of availability" of the content expires). In this manner, the subscriber defines, in advance, the content streams to be provided over a relatively long period of time such that each subscriber receives customized programming. Such additions and deletions will not add latency if they are made at a time other that the above-described the termination notification mechanism.

The presently provided content stream is terminated and the next content stream identified in the playlist 111 is provided in response to a "skip forward" command received from the subscriber. Likewise, the presently provided content stream is terminated and the previous content stream identified in the playlist 111 is provided in response to a "skip backward" command received from the subscriber. Such skipping will not add latency if the server controller 108 knows precisely which content stream is to be accessed.

The presently provided content stream is terminated and the fast forward (FF) or rewind (REW) associated stream is provided in response to the "FF" or "REW" command received from the subscriber. Transitioning to the FF or REW track or content stream will not add latency if the server controller 108 knows precisely where such streams are located.

It will be appreciated by those skilled in the art that the playlist or play queue 111 may be located in the session controller 145 itself, or any functional element in communication with the session controller 145 such that the session controller 145 may update and/or maintain a playlist or play queue 111 for some or all of the subscribers within the information distribution system 100.

Figure 2:
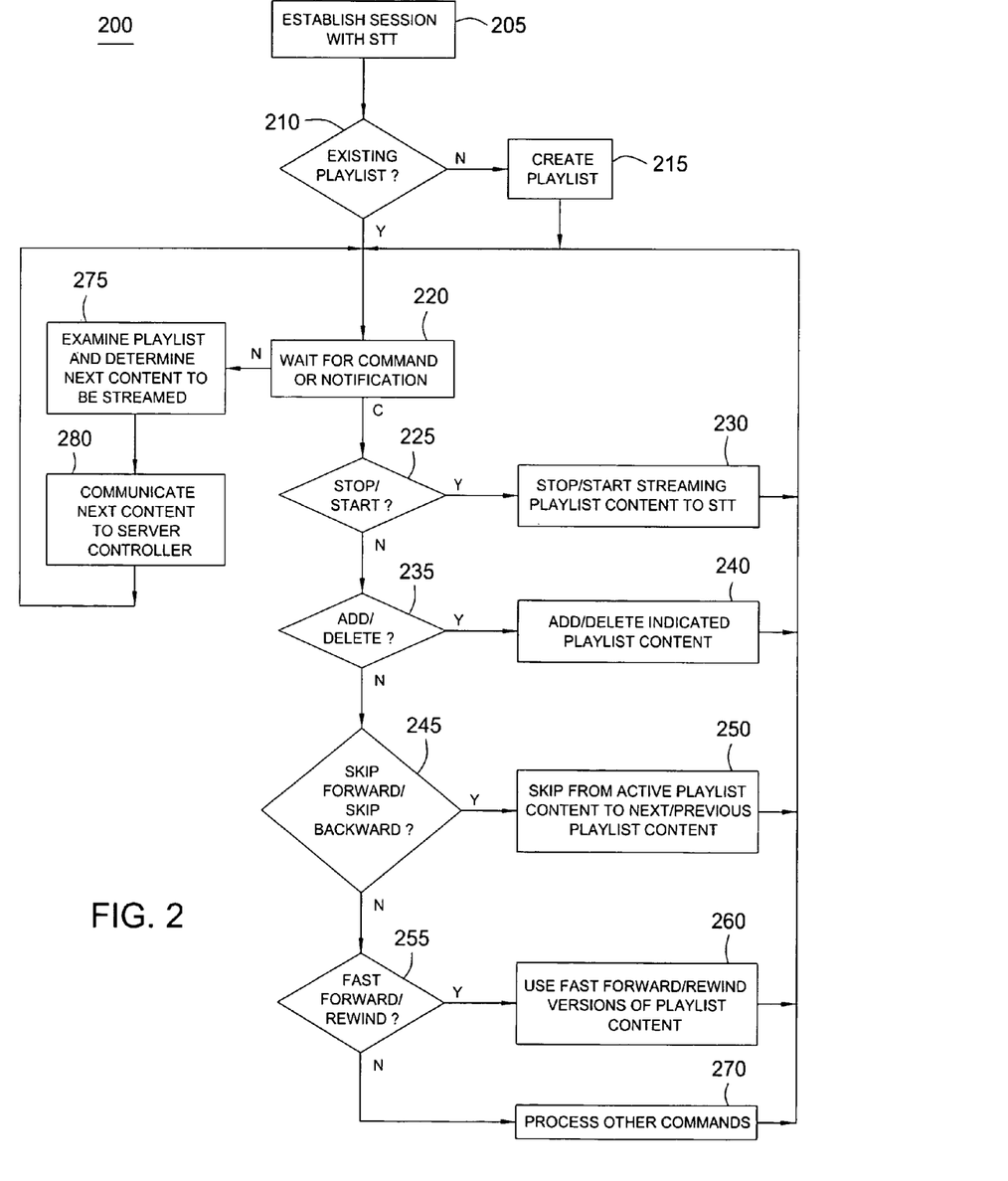
FIG. 2 depicts a flow chart of a method according to the present invention.

FIG. 2 depicts a flow diagram of a method suitable for use in the interactive information distribution system of FIG. 1. Specifically, FIG. 2 depicts a method 200 suitable for use in the session manager 122 of the information distribution system 100 of FIG. 1. When operating according to the method 200 of FIG. 2, the session manager 122 maintains a playlist for each subscriber within the information distribution system 100. In this manner, transitions between content streams may be managed in an efficient, low latency manner without producing undesirable image or audio artifacts upon presentation by the subscriber.

The method 200 is entered at step 205 when the session manager 122 establishes a session with a Set Top Terminal (STT) or Set Top Box (STB) associated with a subscriber. At step 210 a query is made as to whether an existing playlist is available. If the query at step 210 is answered negatively, then a playlist is created at step 215 and the method 200 proceeds to step 220. If the query at step 210 is answered affirmatively, then the method proceeds directly to 220.

At step 220 the session manager 122 waits for a command from the STT or termination notification from the server controller 108. Upon receiving a command from the STT, the method 200 proceeds to step 225. Upon receiving a termination notification from the server controller 108, the method 200 proceeds to step 275. A termination notification is produced by the server controller 108 to indicate that a presently streamed, or "active" content stream is almost finished streaming. That is, the portion of the active content stream not yet provided to the STT is below a temporal or other threshold level (i.e., a predefined amount of time or data not yet provided). As such, to ensure a smooth transition to the next content stream, the server controller 108 must be provided with information identifying the location and other parameters associated with the next content stream to be provided.

At step 275, the session manager 122 examines the playlist 111SC (or playlist 111 if located at the server controller 108), and identifies the next content stream to be provided to the STT. At step 280 the identified next content stream to be provided to the STT is communicated to the server controller 108, such that the server controller 108 may transition between the present (active) content stream and the next content stream. The method 200 then proceeds to step 220, to wait for the next command or termination notification.

At step 225 a query is made as to whether the command received from the STT is either a "start" or "stop" command. If the query at step 225 is answered negatively, then the method 200 proceeds to step 235. If the query at step 225 is entered affirmatively, then the method 200 proceeds to step 230, where the providing (i.e., streaming) of the active content stream to the STT is, respectively, started or stopped. The method 200 then proceeds to step 220, to wait for the next command or termination notification.

At step 235 a query is made as to whether the command received from the STT is either an "add" or "delete" command. If the query at step 235 is answered negatively, then the method 200 proceeds to step 245. If the query at step 235 is answered affirmatively, then the method 200 proceeds to step 240, where the content stream associated with the add or delete command is, respectively, added to or deleted from the playlist. The method 200 then proceeds to step 220, to wait for the next command or termination notification.

At step 245 a query is made as to whether the command received from the STT is either an "skip forward" or "skip backward" command. If the query at step 245 is answered negatively, then the method 200 proceeds to step 255. If the query at step 245 is answered affirmatively, then the method 200 proceeds to step 250, where the presently streamed or "active" playlist content is skipped in favor of the next (skipped forward) or previous (skipped backwards) content identified within the playlist. That is, the content stream presently being provided to the STT is terminated and a new content stream is provided in its place. The new content stream is the content stream immediately following (i.e., next) or preceding (i.e., previous) the terminated content stream. The method 200 then proceeds to step 220, to wait for the next command or termination notification.

At step 255 a query is made as to whether the received command is a fast forward or rewind command. If the query at step 255 is answered negatively, then the method 200 proceeds to step 270. If the query at step 255 is answered affirmatively, then the method 200 proceeds to step 260, where a fast forward or rewind stream associated with the active playlist content is utilized. Thus, in response to a fast forward or rewind command, the content stream presently being provided to the STT is terminated and the respective fast forward or rewind stream associated with the terminated content stream is provided in its place. The method 200 then proceeds to step 220, to wait for the next command or termination notification.

At step 270, a received command other than the commands discusses above with respect to steps 225-260 is processed in the normal manner. Such commands may include, for example, billing or status query commands, general information requests from the STT, navigation commands and the like. The method 200 then proceeds to step 220, to wait for the next command or termination notification.

To facilitate near seamless or seamless transitions between content streams (i.e., little or no visual or audible artifacts), the content streams and any associated fast forward (FF) and rewind (REW) streams are constructed in a manner facilitating such smooth transitions between streams. Specifically, as discussed above, such streams are constructed in a manner provide SMPTE splice points at the beginning, end and various points within the stream. In this manner, transport layer decisions may be made to ensure proper splicing.

It should be noted that some non-zero latency is associated with a change in the sequential presentation of playlist defined content streams. However, such latency is mitigated by careful construction of content streams (e.g., many splice points), by ensuring that the stream controller 108 has continuous access to the playlist 111 (e.g., locating the playlist 111 within the server controller 108) and by utilizing subscriber-side latency masking techniques such as those described in U.S. Pat. No. 5,781,227.

Figure 3:
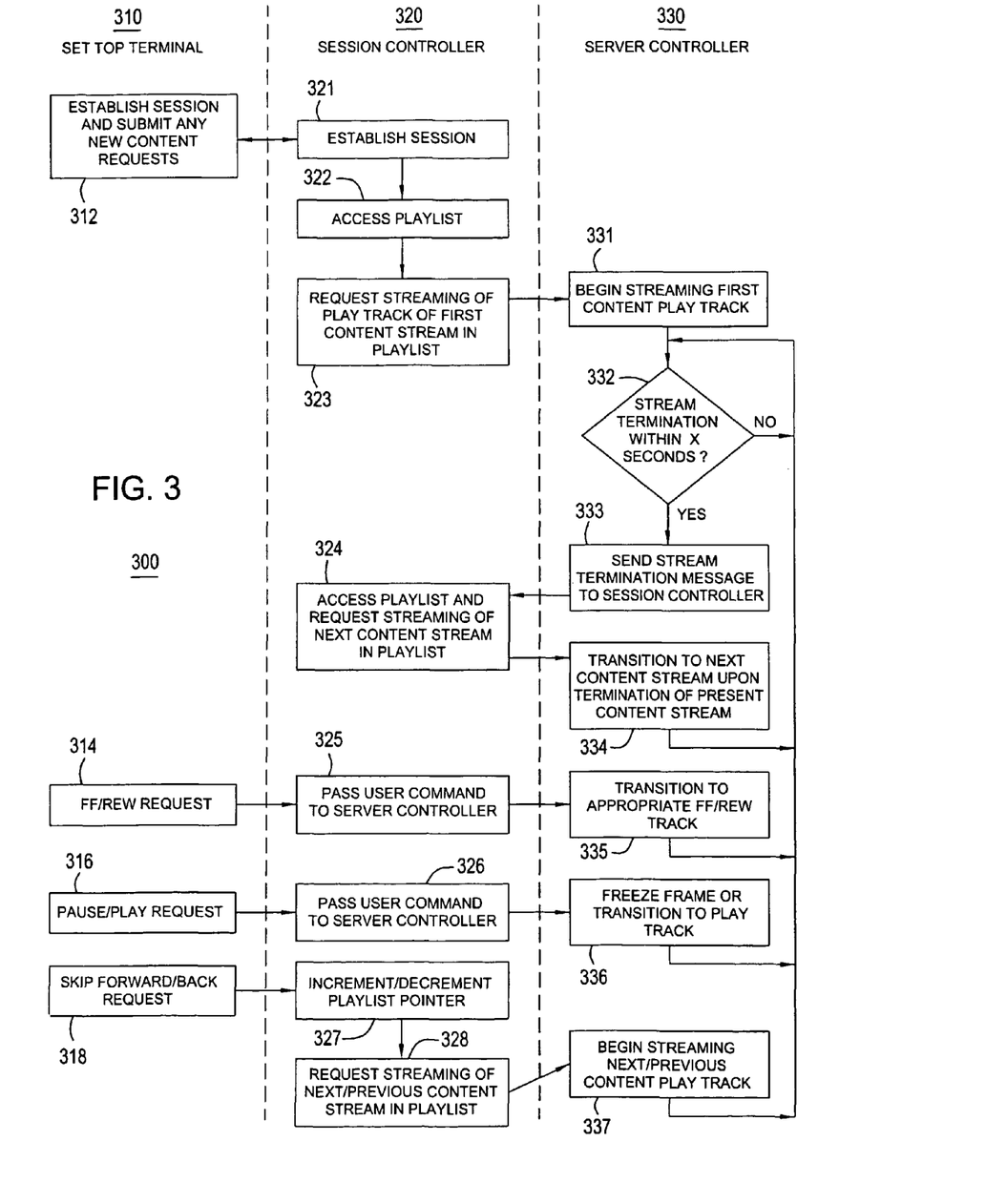
FIG. 3 depicts a flow diagram of a method for updating and utilizing a play list to direct the flow of content to a user.

FIG. 3 depicts a flow diagram of a method for updating and utilizing a play list to direct the flow of content to a user. Specifically, the method 300 of FIG. 3 depicts set top terminal processes 310, session controller processes 320, and server controller processes 330. As previously discussed, a play list 111-SC may be stored within the session controller 145 and used to adapt the operation of the server controller 108 in response to requests provided by the subscriber equipment 106, illustratively set top terminals or subscriber terminals 136 communicating with the session controller 145 via the reverse data channel RDC.

The method 300 of FIG. 3 is initiated at steps 312 and 321, where a session is established between a subscriber terminal and the session controller 145. That is, at step 312, a set top terminal 136 operates to establish a session with the session controller 145 and submit any new content requests. At step 321, the session controller 145 operates to establish a session with the set top terminal. The method 300 then proceeds to step 322, where the session controller 145 accesses the play list associated with the set top terminal requesting a session at step 312. The method 300 then proceeds to step 323.

At step 323, the session controller 145 requests the streaming of the play track of the first content stream of the requesting set top terminal. That is, at step 323 the portion of the play list 111-SC accessed at step 322 that is associated with the requesting set top terminal is used to define a first content stream to be provided to that set top terminal. The request to stream the play track of the first content stream is communicated to the server controller 108. The method 300 then proceeds to step 331.

At step 331, the server controller 108 responds to the stream request of step 323 by initializing a command to server 125 to begin streaming the play track of the first content stream associated with the requesting subscriber. The method 300 then proceeds to step 332.

At step 332, a query is made as to whether the stream presently being provided to the requesting set top terminal is due to terminate within "x" seconds. That is, a determination is made as to whether the stream provided to the set top terminal is scheduled to terminate within a predefined time period, illustratively "x" seconds where "x" may be any real or integer number. The query at step 332 is repeatedly performed until the stream being provided to the set top terminal is within the threshold time period preceding termination of that stream. Thus, when the stream presently being provided to the set top terminal is within the predetermined temporal window prior to stream termination, the method 300 proceeds to step 333.

At step 333, the server controller 108 sends a stream termination message to the session controller 145. The stream termination message includes information such as the stream presently being provided, the subscriber or subscribers presently receiving the stream and other relevant information. The method 300 then proceeds to step 324.

At step 324, the session controller 145 accesses the play list to determine the next content stream to be provided to the requesting set top terminal. The session controller 145 also transmits a request to the server controller 108 to initialize a command to a server 125 to begin streaming the determined content stream upon termination of the present content stream. The method 300 then proceeds to step 334.

At step 334, the server controller 108, in response to the request transmitted to the session controller 145 at step 324, transitions the output stream provided to the requesting set top terminal from the present content stream to the next content stream within the play list. Such transition occurs at the termination point of the presently streamed content stream. Ideally, such transition occurs in a relatively seamless manner such that no undesirable visual or aural artifacts are induced upon the presentation devices associated with the requesting set top terminal. As previously noted, the interactive information distribution system 100 of FIG. 1 provides for "VCR-like" capabilities. The adaptation of the present invention to VCR-like commands will now be discussed with respect to FIG. 3.

At step 314, a set top terminal receiving a content stream submits a fast forward or rewind request to the session controller 145. That is, the set top terminal requests that the play track of the presently streamed content be exited and the associated fast forward track be entered at a point indexed to the present play point. The method 300 then proceeds to step 325. At step 325, the session controller 145 receives a fast forward/rewind request from a subscriber and passes this request to the server controller 108. The method 300 then proceeds to step 335.

At step 335, the server controller 108 transitions the stream provided to the user from the play track to the fast forward or rewind track. That is, the server controller 108 selects a point within the play track at which the play track will be exited. A corresponding entry point into the fast forward/rewind track is then selected. Upon reaching the exit point, the server controller 108 causes the server 125 to transition from the play track to the appropriate fast forward/rewind track at the index point. In this manner, the requested fast forward/rewind track of the content stream is provided to the set top terminal in response to the request at step 314. The method 300 then proceeds to step 332, where a determination is repeatedly made as to whether the presently provided stream is scheduled to terminate within a predefined time window. In this case, the presently provided stream will be the fast forward or rewind track associated with the content being provided to the requesting set top terminal.

At step 316, a pause or play request from the set top terminal 136 is transmitted to the session controller 145. The method 300 then proceeds to step 326 where the session controller 145 passes the pause or play request to the server controller 108. The method 300 then proceeds to step 336, where the server controller 108 causes a "freeze frame" to occur (in response to a "pause" command) or causes an entry of the play track associated with the requested content at the previous pause point. That is, in response to a pause command, the server controller 108 repeatedly streams to the subscriber information causing a single frame to be repeatedly presented. Alternatively, the session controller 145 may cause circuitry within the set top terminal to perform a local "freeze frame." Such circuitry may comprise, for example, a frame buffer within the set top terminal responsive to commands received from the session controller 145. Such set top terminal functionality is known. In the case of a play command, if a stream being provided to the set top terminal comprises a paused or "freeze frame" stream, a fast forward track or a rewind track, the server controller 108 causes the server 125 to begin serving the play track of the requested content at the previously selected pause point, or at a transition point at which the fast forward track or rewind track is exited. In this manner, a set top terminal 136 may terminate a pause, fast forward or rewind presentation. The method 300 then proceeds to step 332.

At step 318, a skip forward or back request is transmitted by the set top terminal 136 to the session controller 145. The method 300 then proceeds to step 327. At step 327 the session controller 145 responsively increments or decrements a play list pointer in response to the skip forward and skip back command. The method 300 then proceeds to step 328, where the session controller 145 sends a request to the server controller 108 indicating that the next or previous content within the play list associated with the requesting set top terminal should be played. The method 300 then proceeds to step 337.

At step 337, the server controller 108 receives the request to begin streaming the next or previous content stream, and responsively acts as the play track associated with the next or previous content stream and begins providing that stream to the requesting set top terminal. The method 300 then proceeds to step 332.

The operation of the method 300 at step 332 is interrupted in the case of a fast forward/rewind request (step 314), pause/play request (step 316) or skip forward/back request (step 318). That is, the session controller 145 indicates to the server controller 108 that a set top terminal command has been received and must be processed.

The method 300 of FIG. 3 illustrates several functional aspects of the present invention. First, the present invention operates to determine if content being streamed will be terminated within a predefined time period. Upon determining that streamed content will terminate shortly, the play list associated with the set top terminal receiving the content is accessed and the next content to be provided to the set top terminal is determined. This information is then utilized by the server controller 108 to effect a smooth transition between the stream scheduled for termination and the next stream to be provided.

A second functional aspect of the present invention is the user manipulation of content. Specifically, user commands for manipulating content (such as fast forward, rewind, play or pause commands) are incorporated into the processing of the content by both the session controller 145 and server controller 108. In this manner, the benefits of utilizing the play list according to the invention do not detract from the interactive experience provided to the user of the system.

A third functional aspect of the present invention is the user manipulation of the play list. For example, a user may update the play list by requesting additional content to be provided. Such updates to the play list append content identifiers to the play list associated with the requesting user. The content identifiers are subsequently used to retrieve the appropriate content upon termination of the content immediately proceeding the new content. The user may also provide skip forward and skip back requests which cause the respectively, next or previous content within the play list to be provided to the user. In this manner, the user maintains control of the content presently being streamed as well as gains control of content to be streamed in the future.

Although various embodiments which incorporate the teachings of the present invention have been shown and described in detail herein, those skilled in the art can readily devise many other varied embodiments that still incorporate these teachings.

What is claimed is:

1. In an information distribution system including provider equipment and subscriber equipment, said provider equipment communicating to said subscriber equipment information streams including content requested by said subscriber equipment, the provider equipment comprising:

a session manager, coupled through a communication network to said subscriber equipment, for interacting with said subscriber equipment and maintaining a plurality of playlists created by subscribers in the information distribution system coupled to the provider equipment, wherein each playlist is associated with a respective subscriber and is created and controlled at said session manager by said subscriber using commands provided to the subscriber equipment by said subscriber, said subscriber equipment being in communication with said session manager to provide said commands to said session manager, said playlist defining a plurality of content streams to be provided to subscriber equipment of the subscriber associated with the playlist and identifying a location of content streams defined in the playlist and a location of auxiliary streams associated therewith, said auxiliary streams further including reverse and fast-forward streams associated with each one of said plurality of content streams defined in said playlist created by said subscriber, each content stream comprising a plurality of splicing entry and exit points dispersed therein to enable transitioning between said plurality of content streams, wherein said splicing entry and exit points are identified within transport packet headers of each one of said plurality of content streams;

a server, coupled to the session manager, for storing said plurality of content streams at locations identified in the playlists, wherein said plurality of content streams are configured to facilitate inter-asset transition to provide seamless splicing; and a server controller, coupled to the server and session manager, for retrieving from said server, content streams defined by said playlist, said content streams being sequentially provided to said subscriber equipment according to said playlist created by said subscriber and in response to commands from said subscriber to play content streams associated with said playlist;

wherein a copy of said playlist is remotely coupled within said information distribution system to the session manager;

said server controller, in response to determining that a remaining portion of a current content stream provided to said subscriber equipment is below a threshold, communicating a termination notification to said session manager;

said session manager, in response to receiving said termination notification, communicating a request to said server controller identifying from said playlist a next content stream to be provided to said subscriber equipment from the server;

said session manager further maintaining said playlist after content streams defined by said playlist have been provided to said subscriber equipment and modifying said playlist and said copy of playlist in response to playlist modification commands received from said subscriber equipment in response to input from the subscriber, wherein a next content stream in said playlist is spliced at an entry point associated with an exit point of a current content stream being provided to said subscriber equipment.

2. The apparatus of claim 1, wherein:

said modification commands comprise at least one of an add command, a delete command, a skip forward command, a skip backwards command, a fast forward command and a rewind command.

3. The apparatus of claim 2, wherein:

said session manager, in response to said add command and said delete command, respectively adding or deleting a subscriber-indicated content stream from said playlist.

4. The apparatus of claim 2, wherein:

said session manager, in response to said skip forward command and said skip backwards command, causing said server controller to begin providing to said subscriber equipment, respectively, a next content stream or a previous content stream within said playlist.

5. The apparatus of claim 2, wherein:
said session manager, in response to said fast forward command and said rewind command, causing said server controller to begin providing to said subscriber equipment, respectively, said fast forward stream or said fast rewind stream associated with a presently provided content stream.

6. The apparatus of claim 1, wherein said server comprises a plurality of servers, each of said plurality of servers storing at least a respective portion of the content streams available to a subscriber, said server controller causing a transport processor to receive a substantially continuous stream of content for each active subscriber regardless of the server presently storing that content.

7. In an information distribution system including provider equipment of a provider and subscriber equipment, said provider equipment communicating content to said subscriber equipment via a distribution network, a provider method comprising the steps of:
establishing a session between a session manager included in said provider equipment and said subscriber equipment of a subscriber, said subscriber equipment being coupled to the session manager via a communications network of said provider;
maintaining, at said session manager, a plurality of playlists created by subscribers in the information distribution system coupled to the provider equipment, wherein each one of said plurality of playlists is associated with a respective subscriber and is created and controlled at said session manager by said subscriber using commands provided to the subscriber equipment by said subscriber, said subscriber equipment being in communication with said session manager to provide said commands to said session manager;
said playlist identifying, at a server, a location of content streams defined in the playlist and a location of auxiliary streams associated therewith and determining, at a server controller coupled to said server and session manager, a sequence of content streams according to said playlist created by said subscriber to be retrieved from said locations at said server in response to commands from said subscriber to play content streams associated with said playlist, said server being coupled to the session manager and to a transport processor for distribution to said subscriber via said communications network of said provider,
each content stream configured to facilitate inter-asset transition to provide seamless splicing and comprising a plurality of splicing entry and exit points dispersed therein to enable transitioning between content streams, wherein said splicing entry and exit points are identified within transport packet headers of each one of said content streams, said auxiliary streams further including reverse and fast-forward streams associated with said content streams defined in said playlist created by said subscriber;
maintaining a copy of said playlist remotely coupled within said information distribution system to the session manager;
transmitting to the session manager from said subscriber equipment a playlist modification command in response to input from the subscriber, said playlist being modified at said session manager in response to transmission of said playlist modification command;
transmitting to the session manager from said subscriber equipment a content stream modification command in response to input from the subscriber, said content stream being modified in response to transmission of said content stream modification command;
determining a next content stream to be provided to said subscriber equipment from said playlist created by the subscriber, wherein determining said next content stream comprises:
communicating a termination notification from said server controller to a session manager in response to determining that a remaining portion of a current content stream provided to said subscriber equipment is below a threshold; and
in response to transmission of said termination notification, communicating a request from said session manager to said server controller identifying from said playlist of a next content stream to be provided to said subscriber equipment;
closing a present content stream being retrieved from said server and provided to said transport processor;
causing said next content stream to be provided to said transport processor upon the termination of the present content stream provided to said transport processor, wherein said next content stream in said playlist is spliced at an entry point associated with an exit point of said current content stream being provided to said subscriber equipment; and
maintaining said playlist and said copy of playlist at said session manager for later recall and use by the subscriber after content streams defined by said playlist and said copy of playlist have been provided to said subscriber equipment.

8. The method of claim 7, wherein:
said modification commands provided by the subscriber comprise at least one of an add command, a delete command, a skip forward command, a skip backwards command, a fast forward command and a rewind command.

9. The method of claim 8, further comprising the step of:
adding or deleting a subscriber-indicated content stream from said play list in response to, respectively, said add command and said delete command.

10. The method of claim 9, further comprising the step of:
in response to said fast forward command and said rewind command, causing said server controller to begin providing to said subscriber equipment, respectively, said fast forward stream or said fast rewind stream associated with a presently provided content stream.

\* \* \* \* \*